United States Patent
Yu (10) Patent No.: US 9,158,549 B2
(45) Date of Patent: Oct. 13, 2015

(54) METHOD, APPARATUS AND SYSTEM FOR BINDING MTC DEVICE AND UICC

(75) Inventor: Wantao Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/347,999

(22) PCT Filed: Jan. 16, 2012

(86) PCT No.: PCT/CN2012/070402
§ 371 (c)(1),
(2), (4) Date: Mar. 27, 2014

(87) PCT Pub. No.: WO2013/067772
PCT Pub. Date: May 16, 2013

(65) Prior Publication Data
US 2014/0244994 A1    Aug. 28, 2014

(30) Foreign Application Priority Data

Nov. 11, 2011 (CN) .......................... 2011 1 0356685

(51) Int. Cl.
*H04L 9/32* (2006.01)
*G06F 9/44* (2006.01)
*H04W 12/04* (2009.01)
*H04L 29/06* (2006.01)
(Continued)

(52) U.S. Cl.
CPC ............ *G06F 9/4401* (2013.01); *H04W 12/04* (2013.01); *H04L 63/0853* (2013.01); *H04W 4/005* (2013.01); *H04W 12/06* (2013.01)

(58) Field of Classification Search
None
See application file for complete search history.

(56) References Cited

U.S. PATENT DOCUMENTS

2009/0209232 A1    8/2009  Cha

FOREIGN PATENT DOCUMENTS

| CN | 102026241 A | 4/2011 |
|----|-------------|--------|
| CN | 102137397 A | 7/2011 |

(Continued)

OTHER PUBLICATIONS

International Search Report in international application No. PCT/CN2012/070402, mailed on Aug. 23, 2012.

(Continued)

*Primary Examiner* — Esther B Henderson
(74) *Attorney, Agent, or Firm* — Oppedahl Patent Law Firm LLC (57) ABSTRACT

A method for binding a Machine Type Communication (MTC) device and a Universal Integrated Circuit Card (UICC) is disclosed. The method includes: during a process of establishment of a shared key, a Network Application Function (NAF) acquires identity information of the MTC device and identity information of the UICC (101); the NAF establishes a binding relationship between the MTC device and the UICC based on the identity information of the MTC device and the identity information of the UICC, and stores the binding relationship into a binding relationship table stored by the NAF (102). An apparatus and system for binding an MTC device and a UICC and a method and system for establishing a shared key between an MTC device and a UICC are further disclosed, such that the binding relationship between the MTC device and the UICC will not be limited by the life cycle of the shared key when the binding between the MTC device and the UICC is implemented in the manner of Generic Bootstrapping Architecture (GBA) with UICC-based enhancements (GBA-U), thus ensuring the security in use of the MTC device and the UICC.

16 Claims, 3 Drawing Sheets

(51) Int. Cl.
   *H04W 12/06* (2009.01)
   *H04W 4/00* (2009.01)

(56) References Cited

FOREIGN PATENT DOCUMENTS

| CN | 102238534 A | 11/2011 |
| WO | 2009046400 A1 | 4/2009 |
| WO | 2011060709 A1 | 5/2011 |
| WO | 2011113355 A1 | 9/2011 |

OTHER PUBLICATIONS

English Translation of the Written Opinion of the International Search Authority in international application No. PCT/CN20121070402, mailed on Aug. 23, 2012.

Supplementary European Search Report in European application No. 12847016.8, mailed on Feb. 3, 2015.

METHOD, APPARATUS AND SYSTEM FOR BINDING MTC DEVICE AND UICC

TECHNICAL FIELD

The disclosure relates to a mobile communication system and Machine Type Communication (MTC) technology, and particularly to a method, apparatus and system for binding an MTC device and a Universal Integrated Circuit Card (UICC).

BACKGROUND

MTC is an application wireless communication technology for implementing machine-to-machine and machine-to-human data communication and exchange. The MTC has a very wide application range, such as intelligent measurement, remote monitoring, tracking, and medical treatment. Compared with the conventional human-to-human communication, the device used for machine-to-machine communication in the MTC (i.e., the MTC device) has a large amount, a wide range of applications, and great market prospect.

The primary long-distance connection technologies in the MTC include a Global System for Mobile Communications (GSM)/General Packet Radio Service (GPRS) technology/a Universal Mobile Telecommunication System (UMTS), and the primary short-distance connection technologies in the MTC include 802.11b/g, bluetooth, Zigbee, Radio Frequency Identification (RFID) and the like. Since the MTC integrates wireless communication and information technology and can be used for bi-directional communication, such as remote information collection, parameters setting and instruction delivery, the MTC can implement different application solutions, such as security monitoring, automatic vending and goods tracking. Almost all devices involved in daily life are likely to be potential service objects of the MTC. The MTC provides simple means for device real-time data to establish wireless connections between systems, between remote devices, or between the system/remote device and a person individual.

In the existing MTC system, the MTC device communicates with an MTC server through a Third Generation Partnership Projects (3GPP) network.

Figure 1:
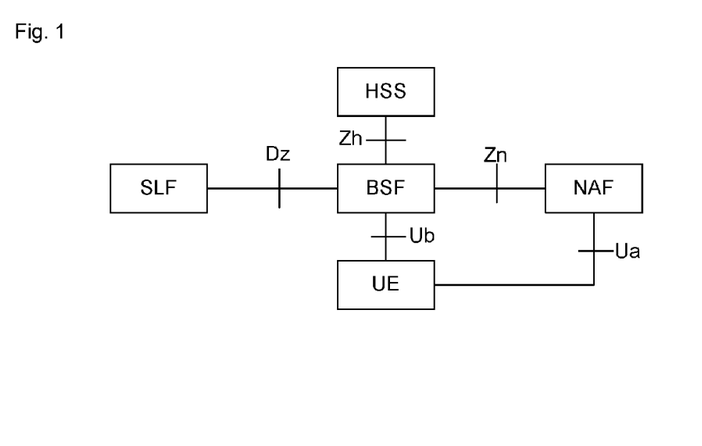
FIG. 1 is a schematic diagram of the composition and structure of the existing GBA.

In the 3GPP system, a shared key may be established between a UICC and a terminal by using a Generic Bootstrapping Architecture (GBA) process, which is configured to establish a secure connection and conducting secure communication between the UICC and the terminal, and the secure connection between the UICC and the terminal may be used for binding the terminal and the UICC. The GBA defines a universal key negotiation mechanism between a terminal and a server. As shown in FIG. 1, the illustration of the GBA and reference points among network element entities thereof is described. A User Equipment (UE) is a collective term of a terminal device (such as a cell phone) and a Universal Subscriber Identity Module (USIM)/Subscriber Identity Module (SIM) card, and here, the terminal may be a plug-in card type of mobile terminal (such as a cell phone), or may also be a plug-in card type of fixed terminal (such as a set-top box). An application server (Network Application Function, NAF) is used to implement a business logic function of an application and provide business service to the UE upon completion of the authentication of the UE. A Bootstrapping Servicer Function (BSF) is a core network element of the GBA, the BSF and the UE implement the authentication by an Authentication and Key Agreement (AKA) protocol and negotiate a session key subsequently used for communication between the UE and the NAF, and the BSF can set a life cycle for the key according to a local policy. A Home Subscriber Server (HSS) stores authentication data of the USIM/SIM card in the UE, such as the key Ki in the SIM card. The BSF acquires, by searching for a Subscriber Locator Function (SLF), related information of the HSS (such as the name of the HSS) storing related user data, and the SLF is not required in a single-HSS environment or when the BSF is configured to use a pre-specified HSS.

Currently, the 3GPP network supports the establishment of the secure connection between the UICC and the terminal in a shared key manner, and the binding between the UICC and the terminal is implemented by the secure connection. The shared key manner defined by the 3GPP is mainly that: a shared key Ks_local between the UICC and the terminal is established in the manner of GBA with UICC-based enhancements (GBA-U), and then the secure connection between the UICC and the terminal is established by using the shared key Ks_local. Such established binding between the UICC and the terminal can only be valid within the life cycle of the shared key Ks_local.

In the MTC system, since the MTC device needs to conduct communication in the absence of human intervention, the MTC device may be used by illegal users during the process of use. Therefore, the binding of the UICC and the MTC device is also required to avoid the illegal use of the UICC and the MTC device. The method for implementing the binding of the UICC and the terminal in the 3GPP may also be used for the binding between the UICC and the MTC device in the MTC system. However, in the MTC system, the binding relationship between the UICC and the MTC device established in the manner of GBA-U can only be valid within the life cycle of the shared key Ks_local. After the life cycle of the shared key Ks_local expires, the binding relationship between the UICC and the MTC device will be out of action, so that the MTC device may be used by other illegal users or the UICC may be used for illegal MTC devices.

Thus, for the 3GPP network and the MTC system, it is a problem to be solved how to avoid the established binding relationship from being limited by the life cycle of the shared key Ks_local when the binding between the MTC device and the UICC is implemented in the manner of the GBA-U.

SUMMARY

In view of the above, the disclosure is to provide a method, apparatus and system for binding an MTC device and a UICC, so as to solve the problem that a binding relationship between the MTC device and the UICC is limited by a life cycle of a shared key Ks_local when an MTC system implements the binding between the MTC device and the UICC in the manner of GBA-U.

In this end, the technical solutions of the disclosure are implemented as follows.

A method for binding an MTC device and a UICC includes:

during a process of establishment of a shared key, an NAF acquires identity information of the MTC device and identity information of the UICC; and the NAF establishes a binding relationship between the MTC device and the UICC based on the identity information of the MTC device and the identity information of the UICC, and stores the binding relationship into a binding relationship table stored by the NAF.

In the above solution, the process of establishment of the shared key may be a process of establishing the shared key in the manner of GBA-U.

In the above solution, the process that the NAF establishes a binding relationship between the MTC device and the UICC based on the identity information of the MTC device and the identity information of the UICC may include:

the NAF searches for a binding relationship of the MTC device and a binding relationship of the UICC based on the identity information of the UICC and the identity information of the MTC device, and establishes the binding relationship between the MTC device and the UICC when there is no binding relationship between the MTC device and the UICC, there is no binding relationship between the MTC device and other UICCs and there is no binding relationship between the UICC and other MTC devices.

In the above solution, the identity information of the MTC device may include one or more of the followings: identification of the MTC device, International Mobile Equipment Identity (IMEI) of the MTC device, an International Mobile Equipment Identity Software Version (IMEISV) of the MTC device, and application identification of the MTC device;

the identity information of the UICC may include one or more of the followings: Integrate Circuit Card Identity (ICCID) of the UICC, identity information of a Universal Subscriber Identity Module (USIM) on the UICC, and application identification of the UICC; and the establishing the binding relationship between the MTC device and the UICC may include: establishing a corresponding relationship between any one or more of the identity information of the MTC device and any one or more of the identity information of the UICC.

In the above solution, the method may further include that: the NAF updates the binding relationship table stored by the NAF according to user requirement.

A method for establishing a shared key between an MTC device and a UICC includes:

an NAF receives a service request including identity information of the MTC device and identity information of the UICC from the MTC device;

the NAF searches for a binding relationship of the MTC device and a binding relationship of the UICC from a binding relationship table stored by the NAF based on the identity information of the MTC device and the identity information of the UICC; and when there is a binding relationship between the MTC device and the UICC, the NAF generates a shared key used for secure communication between the MTC device and the UICC, determines a life cycle of the shared key, and returns the shared key and the life cycle of the shared key to the MTC device.

An apparatus for implementing a binding between an MTC device and a UICC includes: an acquisition unit, a binding unit and a storage unit, wherein the acquisition unit is configured to acquire identity information of the MTC device and identity information of the UICC during a process of establishment of a shared key;

the binding unit is configured to establish, based on the identity information of the MTC device and the identity information of the UICC acquired by the acquisition unit, a binding relationship between the MTC device and the UICC, and store the binding relationship into a binding relationship table in the storage unit; and the storage unit is configured to store the binding relationship table.

In the above solution, the acquisition unit is configured to, during the process of establishing the shared key in the manner of GBA-U, acquire the identity information of the MTC device and the identity information of the UICC.

In the above solution, the binding unit is configured to search for, based on the identity information of the UICC and the identity information of the MTC device acquired by the acquisition unit, a binding relationship of the MTC device and a binding relationship of the UICC in the binding relationship table stored in the storage unit, and establish the binding relationship between the MTC device and the UICC when there is no binding relationship between the MTC device and the UICC, there is no binding relationship between the MTC device and other UICCs and there is no binding relationship between the UICC and other MTC devices.

In the above solution, the identity information of the MTC device may include one or more of the followings: identification of the MTC device, IMEI of the MTC device, an IMEISV of the MTC device, and application identification of the MTC device;

the identity information of the UICC may include one or more of the followings: ICCID of the UICC, identity information of a USIM on the UICC, and application identification of the UICC; and the binding unit is further configured to establish a corresponding relationship between any one or more of the identity information of the MTC device and any one or more of the identity information of the UICC.

A system for implementing a binding between an MTC device and a UICC includes: the MTC device, the UICC and an NAF, and the NAF may include an acquisition unit, a binding unit and a storage unit, wherein the acquisition unit is configured to, during a process of establishment of a shared key, acquire identity information of the MTC device and identity information of the UICC from the MTC device after the MTC device acquires the identity information of the UICC from the UICC;

the binding unit is configured to establish, based on the identity information of the MTC device and the identity information of the UICC acquired by the acquisition unit, a binding relationship between the MTC device and the UICC, and store the binding relationship into a binding relationship table in the storage unit; and the storage unit is configured to store the binding relationship table.

In the above solution, the identity information of the MTC device may include one or more of the followings: identification of the MTC device, IMEI of the MTC device, an IMEISV of the MTC device, and application identification of the MTC device;

the identity information of the UICC may include one or more of the followings: ICCID of the UICC, identity information of a USIM on the UICC, and application identification of the UICC; and the binding unit is further configured to establish a corresponding relationship between any one or more of the identity information of the MTC device and any one or more of the identity information of the UICC.

A system for establishing a shared key between an MTC device and a UICC includes: an MTC device, a UICC and an NAF, wherein the MTC device is configured to interact with the UICC, initiate the establishment of the shared key, and acquire identity information of the UICC from the UICC; and the NAF is configured to: receive a service request including identity information of the MTC device and the identity information of the UICC from the MTC device, search for a binding relationship of the MTC device and a binding relationship of the UICC from a binding relationship table stored by the NAF based on the identity information of the MTC device and the identity information of the UICC; and when there is a binding relationship between the MTC device and the UICC, generate a shared key used for the secure communication between the MTC device and the UICC, obtain a life cycle of the shared key, and return the shared key and the life cycle of the shared key to the MTC device.

In the method, apparatus and system for binding an MTC device and a UICC provided in the disclosure, the NAF acquires the identity information of the MTC device and the identity information of the UICC during the process of establishment of the shared key, establishes and stores the binding relationship between the MTC device and the UICC, and implements the binding between the UICC and the MTC device to limit the use of the UICC to the specific MTC device, such that the binding relationship between the MTC device and the UICC will not be limited by the life cycle of the shared key when the binding between the MTC device and the UICC is implemented in the manner of GBA-U, thus ensuring the security in use of the MTC device and the UICC in real time.

DETAILED DESCRIPTION

The basic idea of the disclosure is that: during the process of establishing a shared key by the UICC and the MTC device, a binding relationship between the UICC and the MTC device is established on an NAF and is stored into a binding relationship table, which implements the binding of the UICC and the MTC device, so as to limit the use of the UICC to the specific MTC devices.

Figure 2:
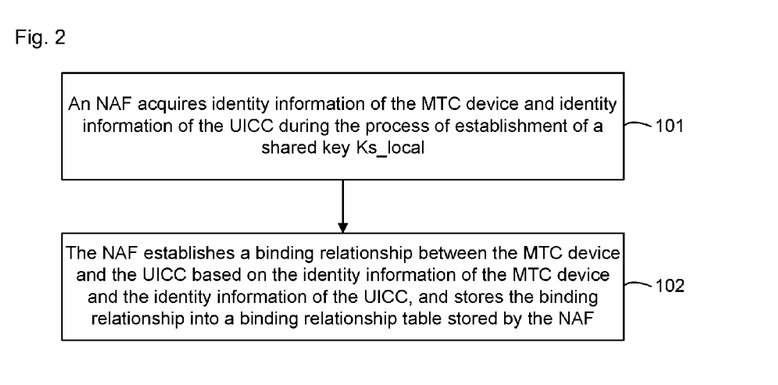
FIG. 2 is a flowchart of implementing a method for binding an MTC device and a UICC according to the disclosure.

As shown in FIG. 2, a method for binding an MTC device and a UICC according to the disclosure may mainly include the following steps:

Step 101: An NAF acquires identity information of the MTC device and identity information of the UICC during the process of establishment of a shared key Ks_local.

Here, the process of establishment of the shared key is specifically a process of establishing the shared key Ks_local in the manner of GBA-U.

Step 102: The NAF establishes a binding relationship between the MTC device and the UICC based on the identity information of the MTC device and the identity information of the UICC, and stores the binding relationship into a binding relationship table stored by the NAF.

In practical applications, when secure communication between the MTC device and the UICC is necessary and there is no shared key Ks_local between the MTC device and the UICC, the process of establishing the shared key Ks_local is initiated. During the process of establishing of the shared key Ks_local, the NAF acquires the identity information of the MTC device and the identity information of the UICC, and establishes the binding relationship between the MTC device and the UICC based on the identity information of the MTC device and the identity information of the UICC and stores the binding relationship into the binding relationship table.

The establishing the binding relationship between the MTC device and the UICC may specifically be: establishing an association relationship between the identity information of the MTC device and the identity information of the UICC.

Here, the identity information of the MTC device may include one or more of the followings: identification (Terminal_ID), IMEI, IMEISV and application identification (Terminal_appli_ID) of the MTC device and other information.

The identity information of the UICC may include one or more of the followings: ICCID of the UICC, identity information of a USIM on the UICC (such as International Mobile Subscriber Identification Number (IMSI) of the USIM), application identification of the UICC (UICC_appli_ID) and other information.

Here, the establishing the binding relationship between the MTC device and the UICC may include: establishing a corresponding relationship between any one or more of the identity information of the MTC device and any one or more of the identity information of the UICC.

In practical applications, the binding relationship between the UICC and the MTC device may further be updated according to user requirement. In particular, a user logs on to the NAF through the MTC device and sends an update request to the NAF, and when determining that the update request is valid, the NAF updates the binding relationship table stored by the NAF according to the update request. For example, when the original MTC device of the user is damaged or does not belong to the user any more, the user may send an update request to the NAF by logging on to the NAF; and when determining that the update request is valid, the NAF updates, according to the update request, the binding relationship table which is corresponding to the user and is stored by the NAF.

Accordingly, the disclosure further provides a method for establishing a shared key between an MTC device and a UICC, which is implemented in the manner of GBA-U. Specifically, the method includes: after receiving a service request including identity information of the MTC device and identity information of the UICC from the MTC device, the NAF searches for a binding relationship of the MTC device and the binding relationship of the UICC from a binding relationship table stored by the NAF, and when there is a binding relationship between the MTC device and the UICC, the NAF generates a shared key, determines the life cycle of the shared key, and returns the shared key and the life cycle of the shared key to the MTC device.

Here, if there is a binding relationship between the MTC device and other UICCs and/or there is a binding relationship between the UICC and other MTC devices, the NAF rejects the request of the MTC device.

Accordingly, the disclosure further provides an apparatus for implementing a binding between an MTC device and a UICC. The apparatus includes: an acquisition unit, a binding unit and a storage unit. The acquisition unit is configured to acquire identity information of the MTC device and identity information of the UICC during the process of establishment of a shared key. The binding unit is configured to establish a binding relationship between the MTC device and the UICC based on the identity information of the MTC device and the identity information of the UICC acquired by the acquisition unit, and store the binding relationship into a binding relationship table in the storage unit. The storage unit is configured to store the binding relationship table.

Here, the acquisition unit may be configured to, during the process of establishing the shared key in the manner of GBA- U, acquire the identity information of the MTC device and the identity information of the UICC.

Here, the binding unit may be configured to: search for, based on the identity information of the UICC and the identity information of the MTC device acquired by the acquisition unit, a binding relationship of the MTC device and a binding relationship of the UICC from the binding relationship table stored in the storage unit, and establish the binding relationship between the MTC device and the UICC when there is no binding relationship between the MTC device and the UICC, there is no binding relationship between the MTC device and other UICCs and there is no binding relationship between the UICC and other MTC devices. Specifically, the binding unit is configured to establish a corresponding relationship between any one or more of the identity information of the MTC device and any one or more of the identity information of the UICC.

The disclosure further provides a system for implementing binding of an MTC device and a UICC. The system includes: the aforementioned MTC device, UICC and NAF.

In addition, the disclosure further provides a system for establishing a shared key between an MTC device and a UICC. The system may include: an MTC device, a UICC and an NAF. The MTC device is configured to interact with the UICC, initiate the establishment of the shared key, and acquire identity information of the UICC from the UICC. The NAF is configured to: receiving a service request including the identity information of the MTC device and the identity information of the UICC from the MTC device, search for, based on the identity information of the MTC device and the identity information of the UICC, the binding relationship of the MTC device and the binding relationship of the UICC from the binding relationship table stored by the NAF; and when there is a binding relationship between the MTC device and the UICC, generate a shared key used for the secure communication between the MTC device and the UICC, obtain the life cycle of the shared key, and return the shared key and the life cycle of the shared key to the MTC device.

In practical applications, the system for implementing binding of an MTC device and a UICC and the system for establishing a shared key between an MTC device and a UICC may be the same system.

Embodiment 1

In the embodiment, a 3GPP network is taken as an example to illustrate the specific implementation process of binding of the UICC and the MTC device.

Figure 3:
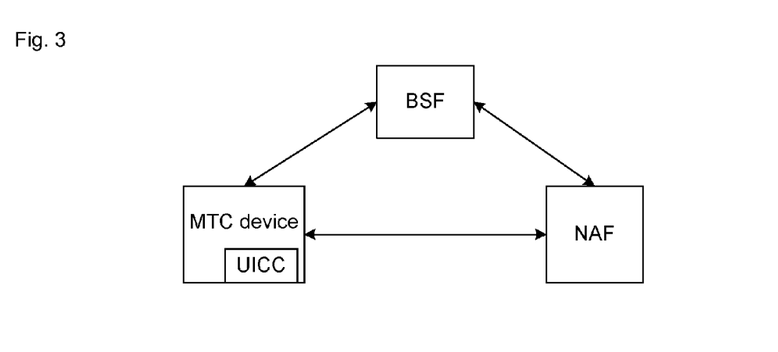
FIG. 3 is a schematic diagram of the composition and structure of a system for binding an MTC device and a UICC according to embodiment 1 of the disclosure.

FIG. 3 is a schematic diagram of the composition and structure of a system for implementing binding of a UICC and an MTC device in the embodiment. The system includes: an MTC device, a UICC and an NAF. The UICC is arranged on the MTC device, the NAF is responsible for establishing a key between the UICC and the MTC device, and the binding relationship between the MTC and the UICC is stored in the NAF.

In practical applications, the system may further include a BSF, and the NAF and the BSF are collectively configured to implement the establishment of the shared key between the UICC and the MTC device in the manner of GBA-U. Specifically, the BSF is configured to authenticate the MTC device by an AKA protocol and can set the life cycle of the shared key in accordance with a local policy. The NAF is a key center used for establishing the shared key between the MTC device and the UICC, and the NAF may either located in a mobile communication network or located outside the mobile communication network.

Wherein, the UICC is provided with a subscriber identification module. Here, the subscriber identification module may be a Subscriber Identity Module (SIM), a Universal Subscriber Identity Module (USIM) or an Internet Protocol (IP) Multimedia Service Identity Module (ISIM).

Figure 4:
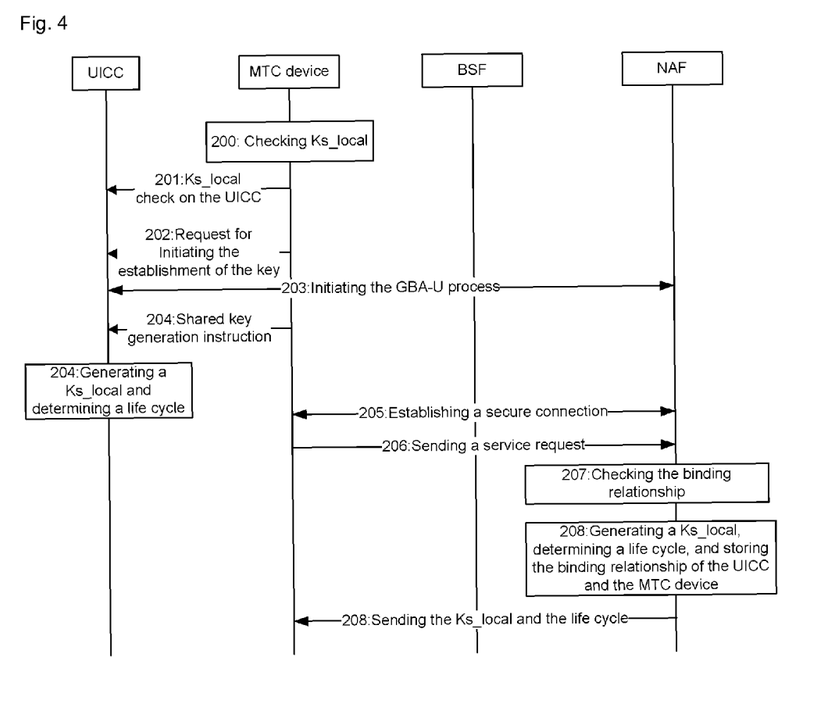
FIG. 4 is a flowchart of binding the MTC device and the UICC according to embodiment 1 of the disclosure.

In the embodiment, the specific implementation flow of binding the UICC and the MTC device, as shown in FIG. 4, may include the following steps:

Step 200: The MTC device checks whether the MTC device stores therein a legal shared key Ks_local for communicating with the UICC. If the MTC device stores therein the legal shared key Ks_local for communicating with the UICC, step 201 is executed; otherwise, a key establishment process based on GBA-U is required to be initiated and step 202 is executed.

Step 201: The MTC device sends a request for checking a share key Ks_local to the UICC, and requests the UICC to check whether the UICC also has a legal shared key Ks_local; and the UICC receives the request and checks whether the UICC has the legal shared key Ks_local. If the UICC has no legal shared key Ks_local, the step 202 is executed; otherwise, the current flow is ended.

Step 202: The MTC device sends a request for initiating the establishment of the key to the UICC.

Here, the request for initiating the establishment of the key may include the identity information of the MTC device. Wherein, the identity information of the MTC device may include one or more of the followings: identification of the MTC device, IMEI or IMEISV of the MTC device, and application identification of the MTC device.

Step 203: The UICC receives the request for initiating the establishment of the key from the MTC device, initiates the GBA-U process, generates an intermediate key Ks_int_NAF and a Bootstrapping Transaction Identifier (B-TID) for identifying the current GBA-U process, acquires an NAF_ID of the NAF from the information stored by the UICC or from the BSF, and feeds back the NAF_ID, the B-TID and the identity information of the UICC to the MTC device.

Step 204: The MTC device sends a shared key generation instruction to the UICC, and the UICC receives the shared key generation instruction, generates the shared key Ks_local, and obtains the life cycle of the shared key Ks_local and other information.

Here, after setting the life cycle of the shared key Ks_local, the BSF returns the life cycle of the shared key Ks_local to the UICC.

Step 205: The MTC device establishes a secure connection with the NAF based on the NAF_ID fed back by the UICC.

Step 206: The MTC device sends a service request to the NAF through the secure connection established with the NAF, and the service request includes the B-TID and the identity information of the UICC fed back by the UICC and the identity information of the MTC device.

Step 207: The NAF searches for, based on the identity information of the UICC and the identity information of the MTC device in the service request, the binding relationship of the MTC device and the binding relationship of the UICC, and when there is no binding relationship between the MTC device and the UICC, when there is no binding relationship between the MTC device and other UICCs and when there is no binding relationship between the UICC and other MTC devices, step 208 is executed.

Specifically, the NAF inquires, from the binding relationship table stored by the NAF, whether there is a binding relationship between the identity information of the UICC and the identity information of the MTC device. If there is a binding relationship between the identity information of the UICC and the identity information of the MTC device, there is a binding relationship between the MTC device and the UICC; otherwise, there is no binding relationship between the MTC device and the UICC.

Step 208: The NAF generates the shared key Ks_local based on the B-TID in the service request information, determines the life cycle of the shared key Ks_local, sends the shared key Ks_local and the life cycle thereof to the MTC device, binds the identity information of the UICC and the identity information of the MTC device in the service request information and then store the identity information of the UICC and the identity information of the MTC device in the binding relationship table stored by the NAF, so as to implement the establishment of the shared key Ks_local and the binding between the MTC device and the UICC.

Wherein, the binding relationship between the UICC and the MTC device may be specifically one or more of the followings:

1: the binding relationship between the UICC and the MTC device: i.e., the corresponding relationship between the ICCID of the UICC and the Terminal_ID of the MTC device;

2: the binding relationship between the USIM on the UICC and the MTC device: i.e., the corresponding relationship between the identity information (such as IMSI) of the USIM on the UICC and the identity information (such as IMEI or IMEISV) of the MTC device; and 3: the association relationship between the application on the UICC and the application on the MTC device: i.e., the corresponding relationship between the UICC_appli_ID of the UICC and the Terminal_appli_ID of the MTC device; or, the corresponding relationship between the ICCID and UICC_appli_ID of the UICC and the Terminal_ID and Terminal_appli_ID of the MTC device; or, the corresponding relationship between the IMSI of the USIM on the UICC and the UICC_appli_ID of the UICC and the identity information (IMEI or IMEISV) of the MTC device and the Terminal_appli_ID of the MTC device.

Figure 5:
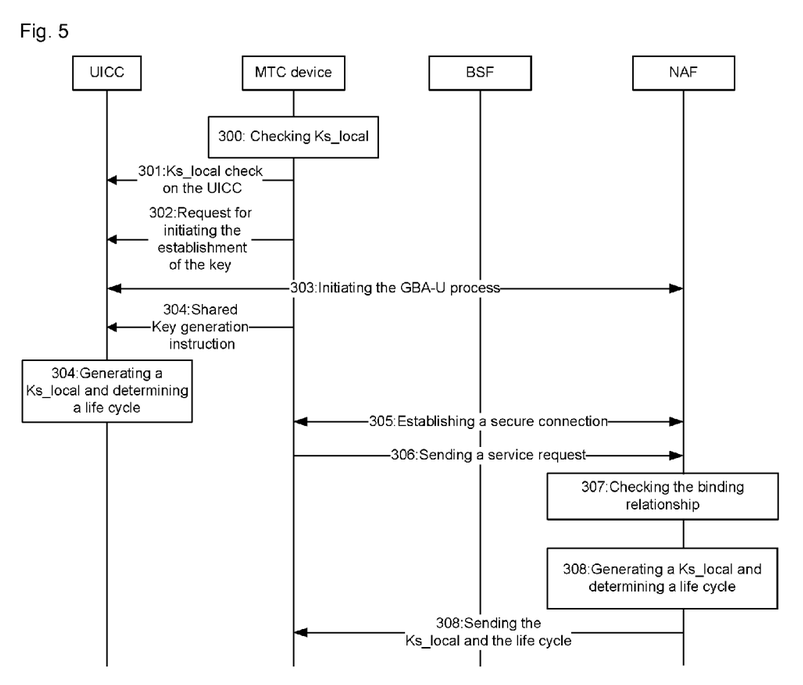
FIG. 5 is a flowchart of establishing a shared key after the MTC device and the UICC is bound according to embodiment 1 of the disclosure.

In practical applications, after the binding relationship between the MTC device and the UICC is established, the shared key Ks_local between the UICC and the MTC device loses effect. When the secure communication is required, the re-establishment of a new shared key Ks_local is necessary. At this moment, the specific implementation flow of establishing the shared key Ks_local, as shown in FIG. 5, may include the following steps:

Steps 300-306 are completely identical to Steps 200-206.

Step 307: The NAF inquires, based on the identity information of the UICC and the identity information of the MTC device in the service request information, the binding relationship of the MTC device and the binding relationship of the UICC, and when the binding relationship exists between the MTC device and other UICCs and/or the binding relationship exists between the UICC and other MTC devices and when there is no binding relationship between the MTC device and other UICCs, the NAF rejects the service request of the MTC and returns a massage indicating the failure of the service request to the MTC device, and the current flow is ended. Step 308 is executed when there is the binding relationship between the MTC device and the UICC.

Step 308: The NAF generates the shared key Ks_local based on the B-TID in the service request information, obtains the life cycle of the shared key Ks_local, and sends the shared key Ks_local and the life cycle thereof to the MTC device to implement the establishment of the shared key Ks_local.

The above are only preferred embodiments of the disclosure, and are not intended to limit the scope of protection of the claims of the disclosure.

The invention claimed is:

1. A method for binding a Machine Type Communication (MTC) device and a Universal Integrated Circuit Card (UICC), comprising:
   acquiring, by a Network Application Function (NAF), identity information of the MTC device and identity information of the UICC during a process of establishment of a shared key; and
   establishing, by the NAF, a binding relationship between the MTC device and the UICC based on the identity information of the MTC device and the identity information of the UICC, and storing the binding relationship into a binding relationship table stored by the NAF.

2. The method according to claim 1, wherein,
   the process of establishment of the shared key is a process of establishing the shared key in the manner of Generic Bootstrapping Architecture (GBA) with UICC-based enhancements (GBA-U).

3. The method according to claim 1, wherein the establishing, by the NAF, a binding relationship between the MTC device and the UICC based on the identity information of the MTC device and the identity information of the UICC comprises:
   searching for, by the NAF, a binding relationship of the MTC device and a binding relationship of the UICC based on the identity information of the UICC and the identity information of the MTC device, and establishing the binding relationship between the MTC device and the UICC when there is no binding relationship between the MTC device and the UICC, there is no binding relationship between the MTC device and other UICCs and there is no binding relationship between the UICC and other MTC devices.

4. The method according to claim 1, wherein
   the identity information of the MTC device comprises one or more of the followings: identification of the MTC device, International Mobile Equipment Identity (IMEI) of the MTC device, an International Mobile Equipment Identity Software Version (IMEISV) of the MTC device, and application identification of the MTC device;
   the identity information of the UICC comprises one or more of the followings: Integrate Circuit Card Identity (ICCID) of the UICC, identity information of a Universal Subscriber Identity Module (USIM) on the UICC, and application identification of the UICC; and
   the establishing the binding relationship between the MTC device and the UICC comprises: establishing a corresponding relationship between any one or more of the identity information of the MTC device and any one or more of the identity information of the UICC.

5. The method according to claim 1, further comprising: updating, by the NAF, the binding relationship table stored by the NAF according to user requirement.

6. A method for establishing a shared key between a Machine Type Communication (MTC) device and a Universal Integrated Circuit Card (UICC), comprising:
   receiving, by a Network Application Function (NAF), a service request including identity information of the MTC device and identity information of the UICC from the MTC device;
   searching for, by the NAF, a binding relationship of the MTC device and a binding relationship of the UICC from a binding relationship table stored by the NAF based on the identity information of the MTC device and the identity information of the UICC; and
   when there is a binding relationship between the MTC device and the UICC, generating, by the NAF, a shared key used for secure communication between the MTC device and the UICC, determining a life cycle of the shared key, and returning the shared key and the life cycle of the shared key to the MTC device.

7. An apparatus for implementing binding between a Machine Type Communication (MTC) device and a Universal Integrated Circuit Card (UICC), comprising:
a processor and a memory, the memory stores an acquisition unit, a binding unit and a storage unit, wherein
the acquisition unit is configured to acquire identity information of the MTC device and identity information of the UICC during a process of establishment of a shared key;
the binding unit is configured to establish, based on the identity information of the MTC device and the identity information of the UICC acquired by the acquisition unit, a binding relationship between the MTC device and the UICC, and store the binding relationship into a binding relationship table in the storage unit; and
the storage unit is configured to store the binding relationship table.

8. The apparatus according to claim 7, wherein the acquisition unit is configured to, during the process of establishing the shared key in the manner of Generic Bootstrapping Architecture (GBA) with UICC-based enhancements (GBA-U), acquire the identity information of the MTC device and the identity information of the UICC.

9. The apparatus according to claim 7, wherein the binding unit is configured to search for, based on the identity information of the UICC and the identity information of the MTC device acquired by the acquisition unit, a binding relationship of the MTC device and a binding relationship of the UICC from the binding relationship table stored in the storage unit, and establish the binding relationship between the MTC device and the UICC when there is no binding relationship between the MTC device and the UICC, there is no binding relationship between the MTC device and other UICCs and there is no binding relationship between the UICC and other MTC devices.

10. The apparatus according to claim 7, wherein
the identity information of the MTC device comprises one or more of the followings: identification of the MTC device, International Mobile Equipment Identity (IMEI) of the MTC device, an International Mobile Equipment Identity Software Version (IMEISV) of the MTC device, and application identification of the MTC device;
the identity information of the UICC comprises one or more of the followings: Integrate Circuit Card Identity (ICCID) of the UICC, identity information of a Universal Subscriber Identity Module (USIM) on the UICC, and application identification of the UICC; and
the binding unit is further configured to establish a corresponding relationship between any one or more of the identity information of the MTC device and any one or more of the identity information of the UICC.

11. A system for implementing binding between a Machine Type Communication (MTC) device and a Universal Integrated Circuit Card (UICC), comprising: the MTC device, the UICC and a Network Application Function (NAF), and the NAF comprises a processor and a memory, the memory stores an acquisition unit, a binding unit and a storage unit, wherein
the acquisition unit is configured to, during a process of establishment of a shared key, acquire identity information of the MTC device and identity information of the UICC from the MTC device after the MTC device acquires the identity information of the UICC from the UICC;
the binding unit is configured to establish, based on the identity information of the MTC device and the identity information of the UICC acquired by the acquisition unit, a binding relationship between the MTC device and the UICC, and store the binding relationship into a binding relationship table in the storage unit; and
the storage unit is configured to store the binding relationship table.

12. The system according to claim 11, wherein,
the identity information of the MTC device comprises one or more of the followings: identification of the MTC device, International Mobile Equipment Identity (IMEI) of the MTC device, an International Mobile Equipment Identity Software Version (IMEISV) of the MTC device, and application identification of the MTC device;
the identity information of the UICC comprises one or more of the followings: Integrate Circuit Card Identity (ICCID) of the UICC, identity information of a Universal Subscriber Identity Module (USIM) on the UICC, and application identification of the UICC; and
the binding unit is further configured to establish a corresponding relationship between any one or more of the identity information of the MTC device and any one or more of the identity information of the UICC.

13. A system for establishing a shared key between a Machine Type Communication (MTC) device and a Universal Integrated Circuit Card (UICC), comprising: the MTC device, the UICC and a Network Application Function (NAF), wherein
the MTC device is configured to interact with the UICC, initiate establishment of the shared key, and acquire identity information of the UICC from the UICC; and
the NAF is configured to: receive a service request including identity information of the MTC device and the identity information of the UICC from the MTC device, search for, based on the identity information of the MTC device and the identity information of the UICC, a binding relationship of the MTC device and a binding relationship of the UICC from a binding relationship table stored by the NAF; and when there is a binding relationship between the MTC device and the UICC, generate a shared key used for secure communication between the MTC device and the UICC, obtain a life cycle of the shared key, and return the shared key and the life cycle of the shared key to the MTC device.

14. The method according to claim 3, wherein
the identity information of the MTC device comprises one or more of the followings: identification of the MTC device, International Mobile Equipment Identity (IMEI) of the MTC device, an International Mobile Equipment Identity Software Version (IMEISV) of the MTC device, and application identification of the MTC device;
the identity information of the UICC comprises one or more of the followings: Integrate Circuit Card Identity (ICCID) of the UICC, identity information of a Universal Subscriber Identity Module (USIM) on the UICC, and application identification of the UICC; and
the establishing the binding relationship between the MTC device and the UICC comprises: establishing a corresponding relationship between any one or more of the identity information of the MTC device and any one or more of the identity information of the UICC.

15. The method according to claim 2, further comprising: updating, by the NAF, the binding relationship table stored by the NAF according to user requirement.

16. The method according to claim 3, further comprising: updating, by the NAF, the binding relationship table stored by the NAF according to user requirement.

* * * * *